United States Patent [19]

Kasser

[11] Patent Number: 5,191,385
[45] Date of Patent: Mar. 2, 1993

[54] METHOD FOR DETERMINING THE SPATIAL COORDINATES OF POINTS, APPLICATION OF SAID METHOD TO HIGH-PRECISION TOPOGRAPHY, SYSTEM AND OPTICAL DEVICE FOR CARRYING OUT SAID METHOD

[75] Inventor: Michel Kasser, Saint-Mande, France

[73] Assignee: Institut Geographique National, Paris, France

[21] Appl. No.: 774,038

[22] Filed: Oct. 7, 1991

[30] Foreign Application Priority Data

Oct. 12, 1990 [FR] France ................... 90 12609

[51] Int. Cl.$^5$ .......................................... G01B 11/26
[52] U.S. Cl. ........................................ 356/5; 356/4; 356/152
[58] Field of Search ........................ 356/4, 5, 152

[56] References Cited

U.S. PATENT DOCUMENTS

| | | | |
|---|---|---|---|
| 4,119,379 | 10/1978 | Zindler | 356/4 |
| 4,218,138 | 8/1980 | Robertsson . | |
| 4,225,226 | 9/1980 | Davidson et al. . | |
| 4,277,167 | 7/1981 | Eppel | 356/5 |
| 4,494,870 | 1/1985 | Hentshel et al. | 356/152 |

FOREIGN PATENT DOCUMENTS 2418938 9/1979 France .

OTHER PUBLICATIONS

IEEE Transactions on Geoscience and Remote Sensing, vol. 25, No. 5, Sep., 1987, pp. 581–591 by S. C. Cohen, et al. entitled "The Geoscience Laser Altimetry/Ranging System".

Proc. ESA Workshop on Sapce Laser Applications and Technology, Mar. 26, 1984, Les Diablerets CH, pp. 61–67; R. Schwarte; entitled "Performance Capabilities of Laser Ranging Sensors".

Article entitled "The Airborne Laser Ranging System, Its Capabilities and Applications", by W. D. Kahn, et al., Sep., 1982, Goodard Space Flight Center (Tech Memo 83984).

Primary Examiner—Mark Hellner
Attorney, Agent, or Firm—Frishauf, Holtz, Goodman & Woodward

[57] ABSTRACT

Elements of an optical system are placed at points (A) and the spatial coordinates of these points are measured. The optical system comprises on the one hand an optical device which may be mounted on board an aircraft (2) and on the other hand reflectors (10) such as reflectors of the cube corner type. The optical device includes a pulsed laser source and a detector which is sensitive to the radiation emanating from the laser source. The desired spatial coordinates are determined from measurements of transit times of reflected laser pulses.

The pulses (8) emitted by the laser source are caused to diverge in order to increase the width of their angular field and the radiation reflected from the reflectors (10) is collected in a wide field and transmitted to the detector.

The system is applicable in particular to high-precision topography for the purpose of analyzing land subsidence.

34 Claims, 4 Drawing Sheets

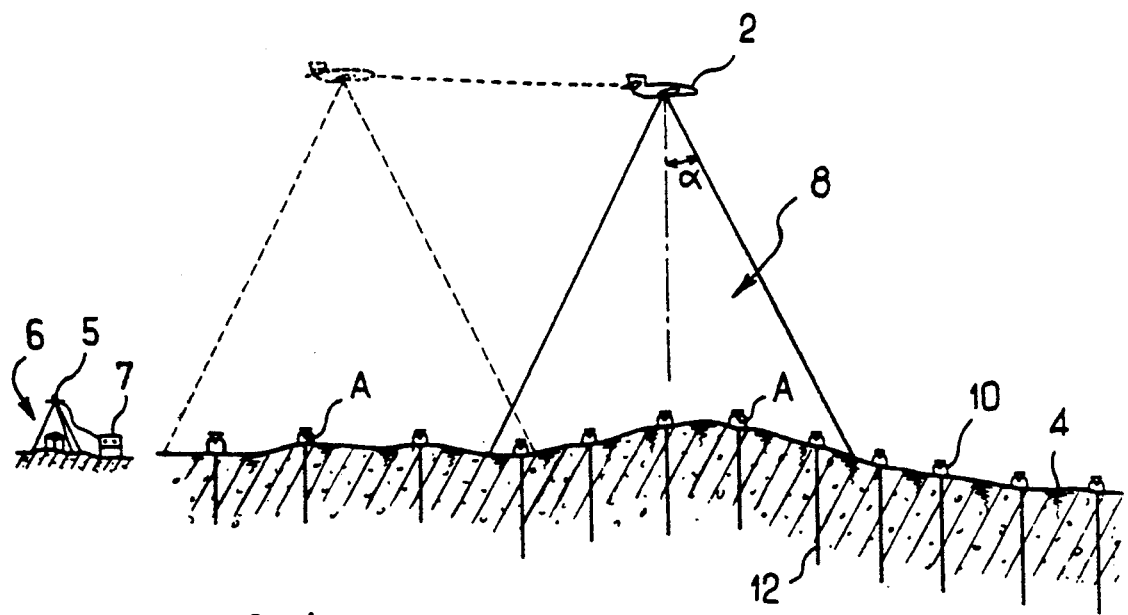
FIG_1
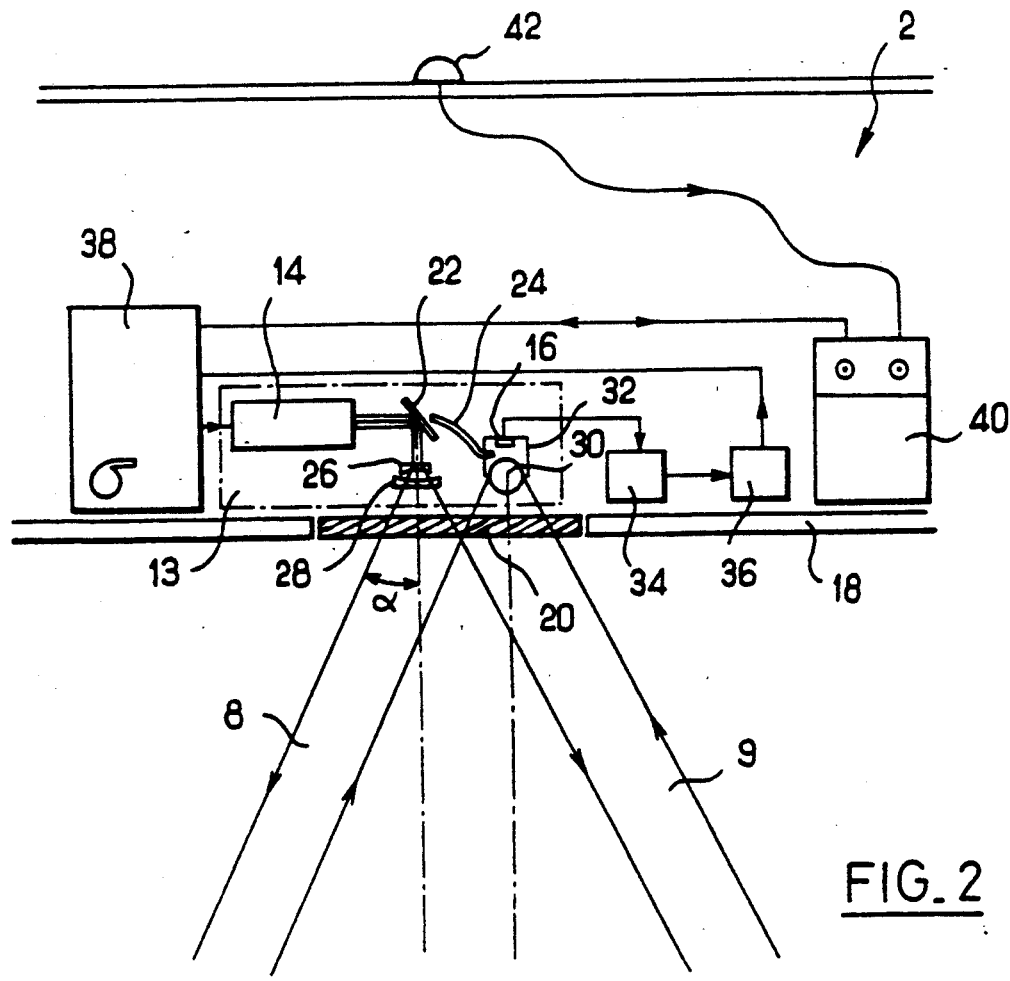
FIG_2

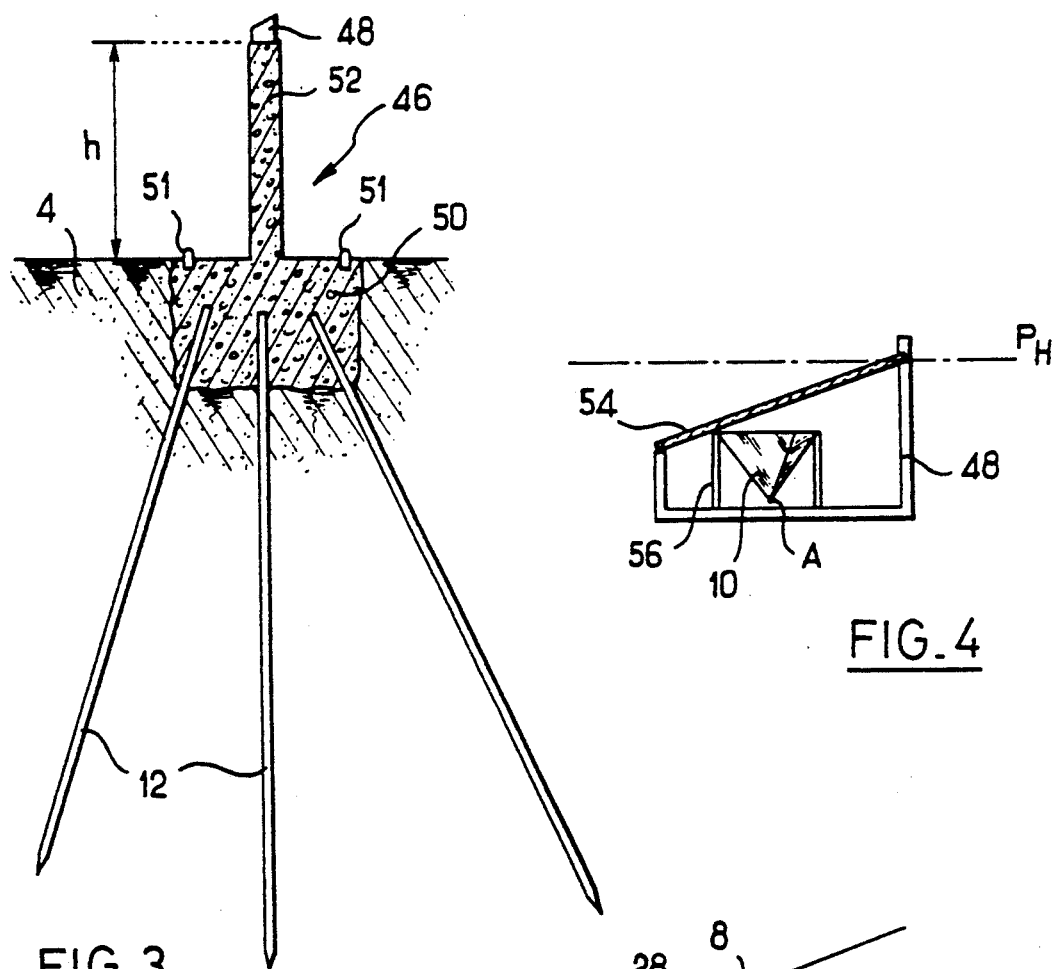
FIG.3
FIG.4
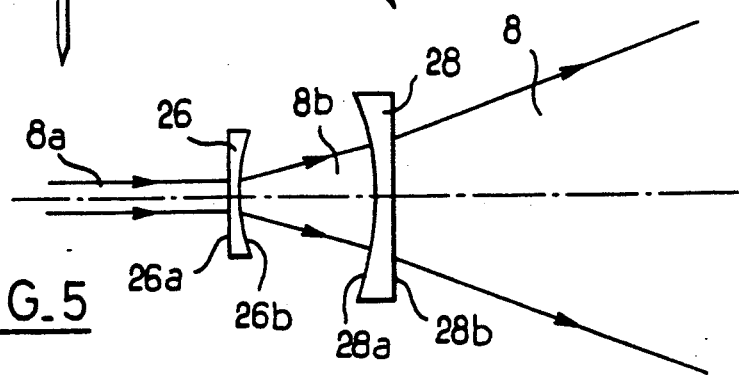
FIG.5
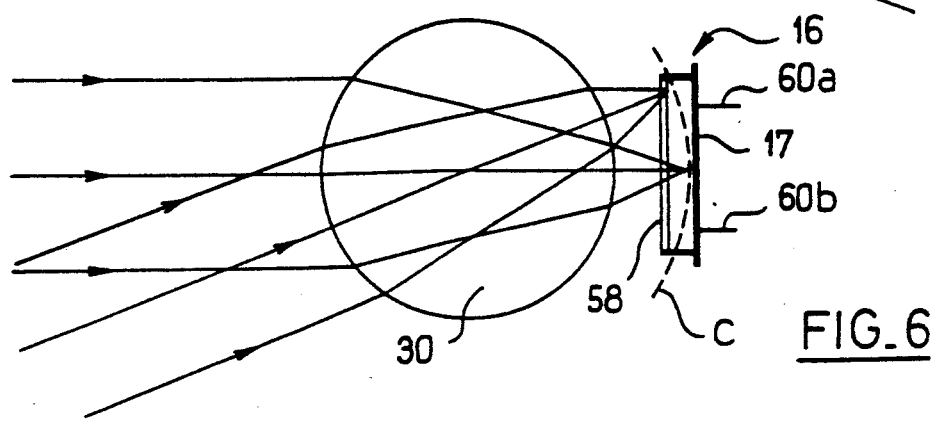
FIG.6

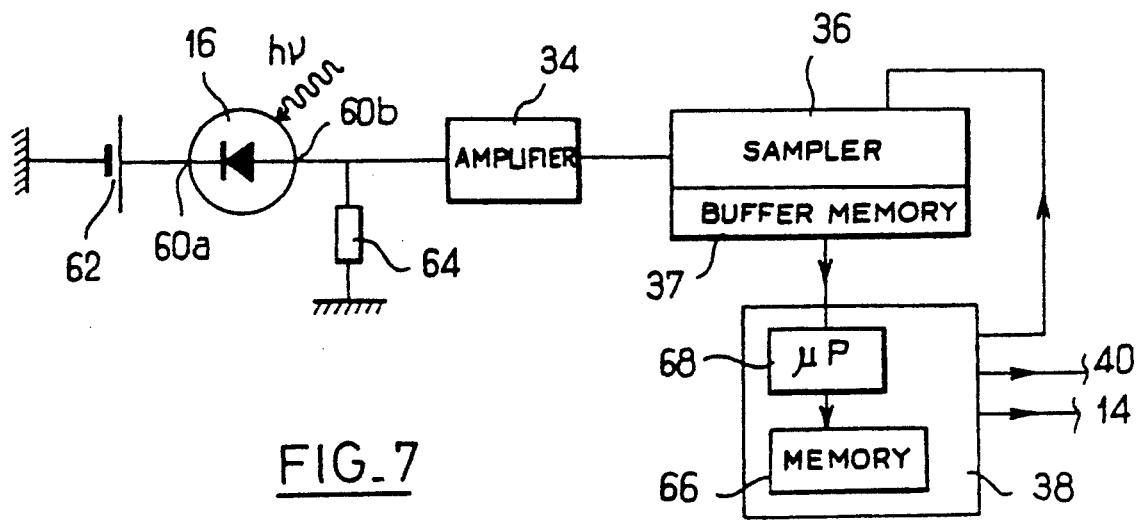
FIG_7
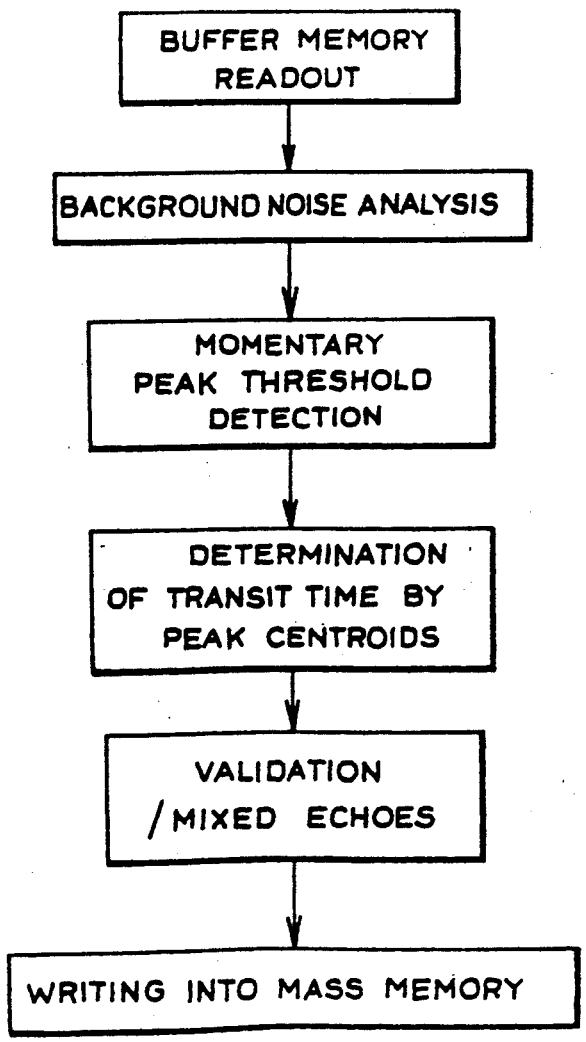
FIG_8

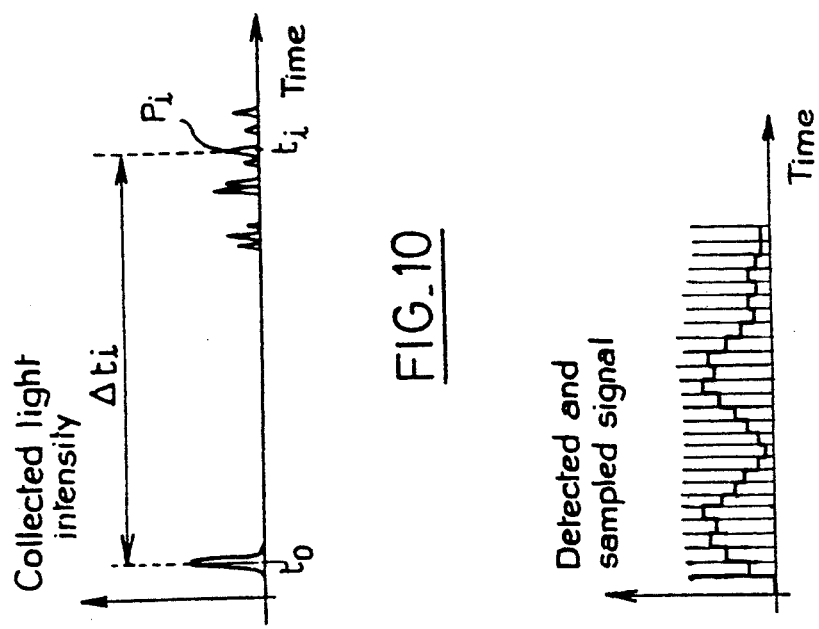
FIG_10
FIG_11
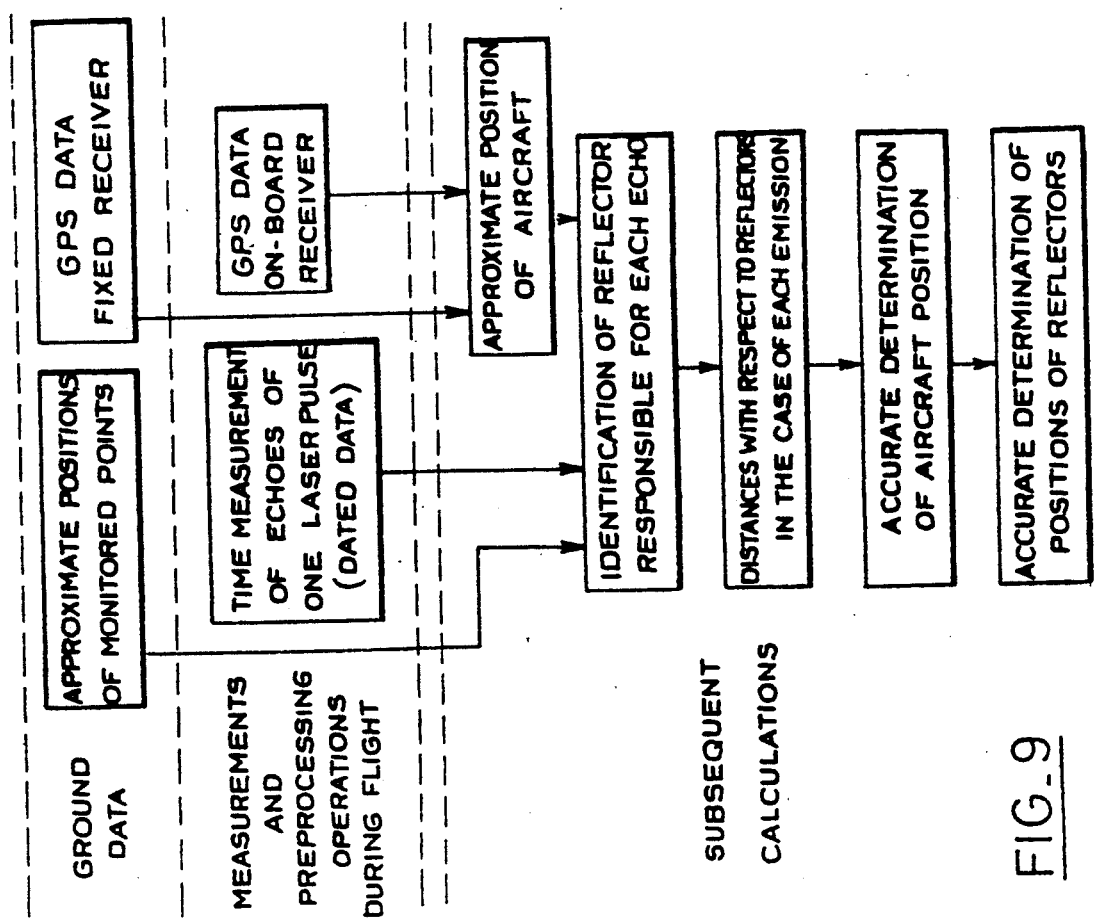
FIG_9

METHOD FOR DETERMINING THE SPATIAL COORDINATES OF POINTS, APPLICATION OF SAID METHOD TO HIGH-PRECISION TOPOGRAPHY, SYSTEM AND OPTICAL DEVICE FOR CARRYING OUT SAID METHOD

BACKGROUND OF THE INVENTION

1. Field of the Invention

The present invention relates to a method for determining the spatial coordinates of points as well as to a system for carrying out said method. The invention also relates to an optical device employed in said method.

2. Description of the Prior Art

The method finds applications in particular in high-precision topography as is required, for example, by owners or operators who exploit underground resources. In fact, in order to exploit or prospect mineral deposits, accurate measurements of subsidence around the zone considered are of great value since they provide indirect information on the evolutionary development of subsurface formations. These topographic measurements are also useful for seismologists in the analysis or prediction of tectonic movements.

In the article entitled "The Airborne Laser Ranging System, its capabilities and applications" (Tech. Memo. 83984, Sep. 1982), W. D. Kahn et al. disclose a telemetry system comprising an optical device mounted on board an aircraft and a plurality of retroreflectors placed on the ground. Starting from a subdivided laser beam, six telemeters are formed, each sub-beam being aimed at one of the ground reflectors through a porthole arranged in the floor of the aircraft. The aircraft is equipped with an on-board inertial system retimed by a radio aid system (Loran C or GPS) in order to determine the position of the aircraft and therefore to permit pointing of the telemeters at the targets as well as to determine its orientation since the six telemeters are not placed geometrically at the same location. Computation of the distances from the transit times of the laser pulses is performed in real time by a recursive Kalman filtering algorithm, thus entailing a long flight (several hours) and limiting the accuracy of measurements to the centimeter scale. The applications concerned are limited to measurement of deformation of the tectonic zones over short intervals of time.

This system involves considerable cost since the following costly elements are indispensable : an accurate inertial system, a high-performance on-board computer, a telemeter having six independent turrets for pointing at the targets, computation software packages, a large-size porthole having the requisite optical properties. Furthermore, the accuracy of these measurements is insufficient for following-up fine subsidences related, for example, to oil-field exploitation, especially on account of its limitation to six targets followed simultaneously. The reliability of the device is reduced by reason of the large number of mechanical elements mounted on board the aircraft. The preparation of each flight for aligning the inertial system is time-consuming. In addition, the aircraft is immobilized over long periods of time for the purpose of installing all the equipment required. Finally, the transmission of collimated laser beams towards the ground makes this system dangerous for the eyes of persons located in the field of vision of the aircraft.

The object of the invention is to overcome the disadvantages mentioned above by proposing a method and a system which make it possible to determine with very high precision the spatial coordinates of points located on the ground or in space and in particular to deduce therefrom the amplitude of minimal ground deformations at a large number of points located at the surface of the ground over an extensive zone while utilizing energy flux densities remote from laser safety threshold values.

Another object of the method in accordance with the invention lies in that fact that these measurements can be carried out rapidly, simply and with economical equipment, thus making it possible to overcome the principal limitations and constraints of known methods.

SUMMARY OF THE INVENTION

The invention thus provides a method for determining the spatial coordinates of points at which are placed elements of an optical system constituted on the one hand by an optical device including a pulsed laser source and a detector which is sensitive to the radiation emanating from said laser source and on the other hand by reflectors, in which the transit times of the pulses emitted by the source, reflected from a reflector and detected by the detector are measured in order to determine relationships between said spatial coordinates.

The distinctive feature of the method in accordance with the invention lies in the fact that the laser radiation emanating from the laser source is caused to diverge in order to increase the width of its angular field and that the radiation reflected from the reflectors is collected in a wide field in order to be transmitted to the detector.

The use of a wide-field laser beam and of detection of wide-field pulses offers many advantages :

there is no need to point the optical device at the target reflectors ; the divergent beam need only be directed very approximately towards the reflectors ;

a very large number of reflectors can be reached simultaneously, thus making it possible to obtain both a greater number of data and greater accuracy by statistical reduction of uncertainty ;

the divergence of the beam minimizes its energy flux density, with the result that the method does not involve any danger for the eyes ;

the optical equipment is relatively simple and inexpensive.

In a preferred embodiment of the method according to the invention, a fraction of the laser pulse emitted by the laser source is withdrawn before said laser pulse is caused to diverge, whereupon said fraction is directed to the detector in order to deliver a transit time reference. The detector output signal which is representative of the light intensity collected by the detector is amplified and the amplified signal is subjected to digital sampling, preferably at a digital sampling frequency higher than 1 GHz. In an advantageous mode of execution of the invention, the amplified and sampled output signal of the detector is processed in order to identify the peaks of said output signal corresponding to reflection of the laser pulse from a reflector and in order to determine the transit times corresponding to the time intervals between said transit time reference and the instant of appearance of said peaks, and a set of values representing said transit times is recorded in memory.

The method outlined above permits measurements with a very high degree of accuracy, this being made possible by digital processing and high-rate sampling. A large number of data can accordingly be processed in real time in order to record the measured transit times which can be utilized in subsequent calculations with a view to accurately deducing therefrom the spatial coordinates of the points of space at which are located both the optical device (for example in order to carry out accurate computation of the flight path of an aircraft in which the device is installed) and the reflectors (for example in order to compute the subsidences in a zone of extraction of geological resources).

The method in accordance with the invention thus involves measurements of transit times of reflected laser pulses at a large number of points on the ground (typically 100) distributed over a zone which extends over a large area (typically 10 kilometers), this being achieved very rapidly (in a few tens of minutes). The accuracy achieved is less than one millimeter whereas realizations in accordance with the technique of the prior art in this type of measurement were limited in accuracy to the centimeter scale.

It should be noted that this enhanced accuracy is obtained while reducing the complexity and cost of the necessary installations.

According to another aspect of the invention, a system is provided for determining the spatial coordinates of points and comprises an optical device which includes a pulsed laser source and a detector which is sensitive to the radiation emanating from said laser source, the system being provided in addition with reflectors and with means for processing the output signal of the detector. The system in accordance with the invention is distinguished by the fact that the optical device also includes divergent optical means for causing divergence of the radiation emitted by the laser source and a wide-field light collector placed in front of the detector in order to transmit thereto a radiation which is collected in a wide field.

This system makes use of the method in accordance with the invention, thus meeting the objectives of the present invention.

The invention is also directed to an optical device for the application of the method, including a laser source and a detector which is sensitive to the radiation emanating from said laser source, the device being distinguished by the fact that it also includes divergent optical means for causing divergence of the radiation emitted by the laser source and a wide-field light collector placed in front of the detector in order to transmit thereto a radiation which is collected in a wide field.

BRIEF DESCRIPTION OF THE DRAWINGS

FIG. 1 illustrates a measurement operation in accordance with the method of the invention.

FIG. 2 is a schematic diagram showing the on-board equipment for carrying out measurements.

FIG. 3 illustrates the support structure for the ground reflectors.

FIG. 4 is a view to a smaller scale showing a detail of FIG. 3.

FIGS. 5 and 6 illustrate optical components of the optical device in accordance with the invention.

FIG. 7 is a diagram of the signal-processing electronic system employed in the invention.

FIGS. 8 and 9 are block diagrams illustrating steps of the method in accordance with the invention.

FIG. 10 is a graph showing a typical recording by the detector.

FIG. 11 is a graphical illustration of the procedure involved in sampling the output signal of the detector.

DETAILED DESCRIPTION OF THE INVENTION

In the detailed description which follows below, the method of measurement and the system employed are described in their preferred application to high-precision topography. However, it will be readily apparent to those versed in the art that they may be employed under many circumstances in which it is sought to obtain precise determinations of spatial coordinates of distant points.

The system carries out measurements of the telemetric type by means of optical equipment. This optical equipment defines light paths along which are propagated short light pulses, the transit times of which are measured in order to deduce therefrom the path length related to the spatial coordinates of the elements of the optical equipment which define said light paths.

With reference to FIGS. 1 and 2, the optical equipment comprises on the one hand an optical device 13 mounted on board an aircraft 2 and on the other hand reflectors 10 distributed over the surface of the ground 4, the subsidences of which are to be measured. In the case of applications relating to prospection and exploitation of geological resources, the reflectors 10 are placed in and around the zone located vertically above the mineral deposit.

The on-board optical device 13 constitutes a device of the pulsed-laser telemeter type.

The device comprises a laser source 14 and a detector 16 which is sensitive to the radiation emitted by the laser source 14 and reflected from the reflectors 10 placed at ground level. The chronometry of the output signal of the detector 16 is utilized in order to deduce the transit time of laser pulses along an optical path which passes from the source 14 to a reflector 10 and returns to the detector 16.

The laser source 14 operates in high-energy pulses of short duration (preferably less than 50 ns) for high-precision measurements. A laser diode or a solid-state laser can thus be employed. In the particular example described in detail below, the source 14 is a Q-switched yttrium-aluminum-garnet (YAG) laser which delivers laser pulses having a time-duration of 15 ns, a wavelength of 1064 nm, an energy of 100 mJ and a pulse repetition rate of 10 Hz.

The light pulses produced by the source 14 are directed towards a dielectric mirror 22 which is treated for the purpose of reflecting the high-energy radiation with high efficiency (approximately 99.9%). The mirror 22 reflects the pulse in the direction of a divergent lens system 26, 28 which is shown in greater detail in FIG. 5. This divergent lens system is composed of two plano-concave lenses 26, 28 mounted in series along the light beam. The beam 8a reflected from the mirror 22 first passes into the lens 26 through its plane face 26a and emerges from its concave face 26b in the form of a divergent beam 8b. This beam 8b then passes through the second lens 28, the diameter of which is larger than that of the first lens 26, by penetrating its concave face 28a and emerging from its plane face 28b in the form of a divergent exit beam 8.

As illustrated in FIGS. 1 and 2, said divergent beam 8 is directed substantially towards the nadir via a porthole 20 provided in the floor 18 of the aircraft 2. The porthole 20 can be of small size (20 cm) but, from an optical standpoint, must constitute a plate having parallel faces. The porthole 20 can be formed of material having the optical quality of window glass. Its thickness is chosen as a function of the pressurization of the aircraft. The angular field of the divergent beam 8 is sufficient to ensure that a number of ground reflectors 10 can receive the divergent radiation. The semivertical angle a of the cone corresponding to the field of the divergent beam preferably has a value between 5° and 35°, depending on the altitude of the aircraft 2 and the distribution of the reflectors 10 on the ground 4. Dimensioning of the lenses forming the divergent optical system is a simple optical problem for any one versed in the art. In the case of small angles of divergence, the second lens 28 may be superfluous whereas, in the case of a large angle of divergence, it may prove necessary to add a third lens (for example a meniscus lens). As will be readily apparent, other configurations and other types of lenses can produce the desired divergence.

The reflectors 10 and their support structures 46 are illustrated in the views in sectional elevation of FIGS. 3 and 4. The reflector 10a preferably has the well-known shape of a cube corner having for example a diameter of 6 cm. The optical characteristics of this type of reflector are known :

the reflected beam is strictly parallel to the incident beam, irrespective of the angle of incidence ;

the length of the optical path of travel of any reflected ray is equal to that of a ray impinging on the wave surface which passes through the vertex A of the cube corner.

In consequence, the geometrical point which defines the point of return of the reflected divergent beam 8 is the vertex A of the cube corner 10.

The cube corner 10 is mounted on a support structure 46 with its open side oriented approximately towards the zenith. In the example illustrated in FIGS. 3 and 4, each support structure 46 of a reflector 10 is anchored in the ground 4 to a substantial depth. This is obtained by driving into the ground 4 as far as possible a number of large-section steel rods 12 (such as, for example, railroad rails, steam-duct tubes or the like).

Said rods 12 are then joined together within a cubic block 50 of reinforced concrete of approximately 1 m$^3$ which does not project above the ground 4 and on which are installed four bench marks 51 having a hemispherical head of brass located at a distance of 20 cm from each corner of the block 50, leveling of which will permit detection of any possible tilting of the support structure as a whole.

At the center of the block 50, a pillar 52 of reinforced concrete 30 cm in diameter stands at a height h which is typically two meters. At the top end of the pillar is fixed a housing 48 for the retroreflector device, composed of the cube corner 10 protected by a glass window 54 having parallel faces treated with an antireflection coating and inclined at approximately 20° with respect to a horizontal plane $p_H$ in order to prevent stagnation of water droplets after rain or morning dew (see FIG. 4).

The cube corner 10 is oriented towards the zenith and supported by feet 56 within its housing 48.

The light reflected from the cube corners 10 travels upwards to the aircraft 2 and again passes through the porthole 20. The optical system for receiving the optical device 13 includes a spherical lens 30 which constitutes a wide-field light collector, the wide field being designated by the reference 9. The spherical lens 30 having a diameter of 8 mm, for example, is preferably placed as near as possible to the divergent lens system 26, 28 in order to collect a significant quantity of light.

As illustrated in FIG. 2, the rear half of the spherical lens 30 is located within an opaque casing 32 at the bottom of which is placed the detector 16 of the optical device 13. The detector 16 is a pin photodiode having a relatively large sensitive surface area which preferably exceeds 10 mm$^2$. This type of optoelectronic semiconductor component is well-known to those skilled in the art. It is possible by way of example to employ the pin photodiode of the type 30810 marketed by the RCA Corporation, the sensitive surface area of which is approximately 100 mm$^2$.

The relative positioning of the wide-field light collector 30 and of the detector 16 is illustrated in FIG. 6. The focal surface C of the spherical lens 30 is also spherical, with the same geometrical center as the spherical lens 30 and a diameter equal to 1.5 times that of the spherical lens 30. In consequence, the sensitive surface 17 of the photodiode 16 is preferably placed so as to be substantially tangent to the focal sphere C of the lens 30. This configuration permits optimization of the detected light power and the angular width of the reception field 9 of the optical device 13. As shown in FIG. 6, the collected light rays pass through the spherical lens 30 and are deflected towards the sensitive surface 17 of the diode 16 via its window 58.

In FIG. 2, it can be seen that the optical device 13 also includes an optical-fiber segment 24 which extends between the rear side of the dielectric mirror 22 and the detector 16 within the casing 32. The optical-fiber segment 24 is thus placed so as to collect part of the radiation corresponding to the (low) transmission loss of the mirror 22 and in order to direct it to the detector 16. As will be explained hereafter, this fraction of radiation serves as a reference for measurement of the transit times of the reflected laser pulses. As will be readily apparent, the use of an optical-fiber segment 24 for delivering a transit time reference can be replaced by any configuration which produces an equivalent result.

The light signal detected by the pin photodiode 16 is processed by signal-processing means illustrated in FIGS. 2 and 7. The electric circuit arrangement of the pin photodiode 16 is shown in the left-hand portion of FIG. 7. The pin diode 16 is fed by a dc reverse bias current supply 62 which delivers a voltage of 50 volts, for example. The negative terminal of the supply 62 is connected to ground and its positive terminal is connected to the prong 60a of the pin photodiode 16 which is connected to the n-doped region of the photodiode 16. Illumination of the sensitive intrinsic region of the pin diode generates an electric current which is proportional to the collected light intensity.

This electric current is delivered to the second prong 60b of the pin photodiode 16 which is connected to the p-doped region of the photodiode 16. The connector 60b is connected to the input of an amplifier 34. In order to convert the current signal to a voltage signal, a load resistor 64 having a value of 150 ohms, for example, is mounted between the connector 60b and ground, that is to say in parallel with the circuit branch which includes the supply 62 and the diode 16.

The passband of the amplifier 34 has an upper limit which is preferably below 50 MHz and equal to 20 MHz, for example. The amplifier gain is intended to produce amplification of the voltage signals on the order of one hundred microvolts in order to deliver voltage signals on the order of a few volts at the output. These output analog signals are applied to the input of a digital sampling device 36.

The digital sampling device 36, which comprises an internal clock and analog-to-digital converter, converts the analog signal which is applied to its input to digital signals representing histogram data coded on eight bits obtained by sampling of the signal. These histogram data are then stored in a buffer memory 37. The digital sampling frequency is very high and preferably higher than 1 GHz. One example of a digital sampling device 36 which can be employed within the field of the invention is the type-6880 sampler marketed by the Le Croy Company or the type-7200 digital oscilloscope marketed by the Le Croy Company, both samplers being provided with a built-in buffer memory 37. The sampling frequencies of the devices are respectively 1.3 and 1.4 GHz with 8-bit coding. The sampling device 36 is controlled by a synchronized start-of-sampling signal delivered by a control unit 38.

A microprocessor 68 is provided for the purpose of reading the histogram data written into the buffer memory 37 and performing digital preprocessing operations described in detail hereinafter with a view to computing transit times of pulses detected by the photodiode 16. These transit time values are then written into a storage memory 66 in order to be subsequently read for the purpose of carrying out other processing operations. In one example of execution of the invention, the microprocessor 68 (for example a type-68030 microprocessor marketed by the Motorola Company) and the storage memory 66 form part of a microcomputer 38 which constitutes the unit for control and storage of data of the measuring system in accordance with the invention. This unit 38 delivers signals for initiating the emission of pulses by the laser source 14 of the optical device 13 and synchronized control signals which initialize the sampling cycles of the sampling device 36.

The system in accordance with the invention is also provided with means for approximate positioning of the aircraft 2 and of the optical device 13.

To this end, there is installed in the aircraft 2 a radiopositioning receiver 40 for determining (if necessary a posteriori) the position of the aircraft 2 whenever this is desired and at any moment. The radio transmission system designated as GPS (Global Positioning System) which is well-known to those conversant with the art is particularly suitable for this purpose. It is accordingly necessary to receive at a minimum the simultaneous radio transmissions of four satellites (not shown in the drawings) both in the aircraft 2 and at a point 6 on the ground of known spatial coordinates (which can be located at a distance of several hundred kilometers from the measurement zone), with two respective receivers 40, 7 connected to respective radio reception antennas 42, 5. Said receivers 40, 7 are capable of carrying out measurements at a high rate (at least one per second). It is also possible to make use of the Syledis system of the Sercel Company or the Trident system of the Thomson Company or any other positioning means involving the use of land beacons which are conducive to a precision on the order of one meter in regard to the position of the antenna 42 of the aircraft 2.

If the altitude of the aircraft 2 is not well determined, it can also be measured in that case with an altimeter for measuring the static pressure outside of the aircraft 2.

This approximate positioning of the aircraft 2 and of the optical device 13 is computed for all the instants at which a pulse is emitted by the laser source 14. In consequence, the position of the antenna 42 in respect of each laser emission is known after each return from a flight mission. Moreover, the antenna 42 will be placed on the aircraft 2 in proximity to the vertical mid-plane of the optical device 13 in order to avoid the additional need to measure the orientation of the aircraft 2 with a view to adjusting the position of the antenna 42 to that of the optical device 13.

The radio receiver 40 is also controlled by a synchronized signal derived from the microcomputer 38 so that the instants of approximate measurement of the position of the aircraft 2 coincide with the instants of emission of light pulses by the laser source 14.

In accordance with the method of the invention, the measurement system described in the foregoing and its optical device 13 are operated as follows:

The microcomputer 38 initiates the emission of a laser pulse by the laser source 14 and, at the same time, an approximate measurement of the position of the aircraft by the GPS receiver 40. The signal of the GPS receiver 40 which indicates the position of the aircraft 2 and of the optical device 13 at the instant of emission of the laser pulse is then recorded in the memory 66.

The pulse emitted by the laser source 14 is made divergent by the divergent lens system 26, 28 after a fraction of this pulse has been withdrawn on the rear side of the mirror 22. In a known manner, the light intensity of this fraction which is withdrawn and directed towards the detector 16 by the optical-fiber segment 24 is adjusted by modifying the position of the end of the segment 24 with respect to the rear face of the mirror 22. This withdrawn fraction of the laser pulse is addressed to the detector 16 in order to provide a transit time reference $t_o$ in the form of a first peak of the light intensity detected by the detector 16 (as shown in FIG. 10).

The reflectors 10 located in the widened field of the laser pulse backscatter said incident pulse in the direction of the optical device 13. The wide-field reception lens system of the optical device 13 makes it possible to collect each of the reflected pulses which produce peaks $P_i$ of the detected intensity. Each peak $P_i$ occurs at an instant $t_i$ and the time-duration $\Delta t_i = t_i - t_o$ between said instant $t_i$ and the transit reference to represents the transit time of the reflected pulse. This transit time is proportional to the length of the optical path which extends from the mirror 22 to the vertex A of the corresponding cube corner 10, then returns to the sensitive zone of the detector 16, less the length of the optical path of the reference fraction along the optical fiber 24, the constant of proportionality being the reciprocal of the velocity of light.

The photodiode 16 converts the light pulses to a proportional current intensity signal. The load resistor 64 converts this current intensity signal to a voltage signal which is amplified by the amplifier 34. The peaks of the output signal of the amplifier 34 are increased in time-width with respect to the collected light pulses, the time-width of which is substantially equal to the time-duration of the laser pulses 14, namely 15 ns in the example described. This increase in time-width results from an integration by the amplifier 34 and also by the RC circuit formed by the load resistor 64 and by the residual capacitance of the pin photodiode 16 (approximately 70 pF in the example described). This integration (which produces amplified peaks having a width between 30 and 40 ns) and the relatively narrow passband of the amplifier 34 remove part of the undesirable noise of the detector 16 (resulting for example from the thermal production of electron-hole pairs in the intrinsic zone of the pin diode) without impairing the accuracy of measurement of the instants $t_i$ since these instants $t_i$ essentially represent the centers of gravity of the peaks $P_i$ which are not displaced by the integration.

The high-speed digital sampling device 36 converts the amplified analog signal to a digital signal representing histogram data as illustrated schematically in FIG. 11 in which the time scale shown on the axis of abscissae is smaller than that of the graph of FIG. 10. The time-duration of a sampling channel is shorter than 1 ns, thus permitting very accurate measurements of the position $t_i$ of the centers of the peaks.

After having passed through the buffer memory 37, the histogram data are read by the microprocessor 68 which carries out the digital preprocessing operations illustrated in the block diagram of FIG. 8. A suitable program is loaded into the microprocessor 8. This program carries out rapid calculations of a known type in order to deduce the value of the transit times $\Delta th\ i$ from the histogram data. It first analyzes the background noise of the digital signal by employing a technique of the sliding mean type in order to deduce therefrom a momentary detection threshold. When the digital signal exceeds this threshold during a predetermined number of channels, the program considers that it has identified a reflected pulse. It then computes the centroid of each peak representing a reflected pulse, which is equal to the instant $t_i$ representing the peak $P_i$ considered. The program then subtracts the value $t_o$ from the centroid of the reference peak in order to deduce therefrom the transit time $\Delta t_i = t_i - t_o$ of this pulse. After a validation step, it writes in the storage memory 66 a set of values representing these transit times $\Delta t_i$. The object of the validation step is to make sure that an identified peak does not correspond to an overlap of several pulses which have traveled along optical paths having lengths which are very close in value. To this end, the program of the microprocessor 68 makes sure that the width of the peaks which it has identified does not exceed a predetermined threshold value which is slightly higher than the theoretical width of a single peak and equal to the time-duration of the laser pulse emitted by the source 14 increased by the integration time constants of the detection and amplification circuit. The peaks which exceed said width threshold are excluded from the processing operation. This validation procedure is satisfactory since the probability of two pulses being so close together as to form a single peak of smaller width than the threshold value is negligible.

It is worthy of note that all the operations which involve processing of the output signal of the detector 16 and recording in memory 66 are performed at a sufficiently high rate (by making use of a high-speed microprocessor) to be included in the period which elapses between two successive emissions of laser pulses by the source 14, namely 0.1 s in the case described of an emission frequency of 10 Hz. This high speed permits computation and recording of transit times in real time during a measurement mission and makes it possible to carry out a very large number of measurements during said mission, thus reducing the statistical error in the determination of the coordinates of the points A.

The steps of a complete measurement cycle are illustrated in the block diagram of FIG. 9.

When carrying out a measurement mission with a view, for example, to achieving accurate determination of the position of the reflectors 10 in order to calculate subsidences of an oil producing or mineral deposit, the approximate position of the monitored points at which the cube corners 10 are placed (especially their vertices A) are of course already known. Useful GPS radio transmission data for determining the approximate position of the aircraft 2 are also recorded on the ground by the receiver 7 and its antenna 5. It has been seen that, during flight of the aircraft 2, GPS data of the same nature are recorded by the receiver 40 and its antenna 42. These two sets of data which are measured in synchronism with the pulses emitted by the laser source 14 are processed at the time of subsequent calculations in order to determine the position of the aircraft 2 with a precision on the order of one meter. These calculations are performed in accordance with GPS positioning algorithms which are well-known to those versed in the art.

Starting from known approximate positions of the reflectors 10, from the approximate position of the aircraft 2 in respect of each pulse or emission of the laser 14 and from the dated data stored in the memory 66 and representing the time measurement of the detected echoes of said pulse, it is possible to identify the reflector 10 which is responsible for each of these echoes. This subsequent computation step is performed by computing approximate transit times predicted for each approximate position of an aircraft 2 and each approximate position of a reflector 10 and by comparing all the predicted approximate transit times with all the measured transit times $\Delta t_i$ stored in the memory 66. When the reflectors corresponding to each echo have been identified, a set of values of distances between a geometrical reference point of the optical device 13 and the reflectors 10 is obtained in respect of each emission of the laser 14 by multiplying the transit times $\Delta t_i$ by the velocity of light divided by two.

In order to deduce from these results the precise spatial coordinates of the monitored points A, it is necessary to carry out a resolution by optimization of a system of equations having a number of equations less than NT and a number of unknowns equal to $3N + 3T$, where N designates the number of reflectors 10 placed on the ground 4 and T designates the number of emissions of the laser 14 during the measurement mission. Each of these equations is written:

$$d(i,t) = \sqrt{[X(i) - x(t)]^2 + [Y(i) - y(t)]^2 + [Z(i) - z(t)]^2}$$

where:

d(i,t) designates the distance measured between the vertex A of the $i^{th}$ reflector 10 and the position of the geometrical reference point of the optical device 13 during the $t^{th}$ emission of the laser 14 ($1 \leq i \leq N$, $1 \leq t \leq T$);

X(i), Y(i), Z(i) designate the three spatial coordinates of the vertex A of the $i^{th}$ reflector 10 taken in a predetermined fixed reference frame; and x(t), y(t), z(t) designate the coordinates of the geometrical reference point of the optical device 13 during the $t^{th}$ emission of the laser 14 taken in the same fixed reference frame.

When the points A on the ground are to be determined with accuracy as in the preferred application of the method in accordance with the invention and described herein, one can first eliminate the jI unkowns relating to the position of the optical device 13 (x(t), y(t), z(t)), whereupon the optimization calculation can be applied to the unknowns relating to the position of the reflectors A (X(i), Y(i), Z(i)). The resolution algorithm is a conventional optimization algorithm (least squares or the like) and nevertheless requires to be carried out on a machine which is sufficiently powerful to take into account the large number of data involved. Thus the number N can attain several hundreds and the number T can attain several thousands in typical measurement cycles.

By virtue of the large number of collected data and the accuracy of the detection and processing system, the method in accordance with the invention achieves a remarkably high standard of accuracy of measurement. The present Applicant has thus found that, with a divergent field for laser pulses having a semivertical angle $\alpha$ of 17°, an aircraft 2 flying at an altitude of 10,000 m and laser pulses sent at a rate of 10 Hz to reflectors located at a relative spacing of 500 m, the degree of accuracy obtained is typically less than one millimeter on the coordinates of the points A, namely the vertices of the cube corners 10.

These measurements of accuracy have the further advantage of being performed in a short time (typical flight time of thirty minutes) in a repetitive but economical manner. The equipment is relatively inexpensive in comparison with the systems of the prior art. Furthermore, reliability and simplicity of use are substantially improved since no mechanism is required for sighting the reflector-targets.

In the conventional methods, telemeters make use of collimated lasers (that is to say lasers having an angular divergence of the order of one milliradian) involving the need to direct towards the ground laser beams having an energy density of higher value than the usual safety threshold values. The present invention overcomes this disadvantage by virtue of the divergence of the laser beam which largely reduces this density typically by a factor of 1000), thereby making the beam totally harmless. A measurement mission does not call for any special preparations (telemeter calibration, for example) and can therefore be repeated a large number of times without immobilizing the aircraft 2.

The invention has been described in the foregoing in its preferred application to high-precision topography for subsurface formation testing but could clearly be employed in the field of seismic studies. Moreover, measurements can be performed by placing the optical device 13 at a high point which is visible from a large number of reflectors 10 and not on board an aircraft. In the case just mentioned, the processing operation is advantageously simplified by reducing the number of unknowns since it may be assumed that the optical device 13 is in a fixed location and, in addition, the auxiliary approximate positioning system (GPS) may be dispensed with. In contrast, however, the flexibility of use is reduced.

In another possible application of the invention, the transit time data are utilized for accurate computation of the flight path of the aircraft 2. In this case, the system of equations solved at the time of the subsequent operation is reversed by applying the optimization to the coordinates x(t), y(t), z(t) of the geometrical reference point which is fixed with respect to the aircraft 2.

Although the foregoing description relates to a preferred embodiment which achieves an accuracy of less than one millimeter, it will be understood that the basic concepts of the invention are applicable to any number of alternative embodiments without thereby departing from the scope of the invention.

It is possible in particular to employ components having lower performances (for example a photomultiplier instead of the photodiode 16) if the precision requirements are less stringent than in the example described since the invention offers a sufficient number of advantages to justify its use under many circumstances in which conventional telemetry systems do not prove fully satisfactory.

What is claimed is:

1. A method for determining the spatial coordinates of points (A) at which are placed elements of an optical system, the optical system comprising an optical device (13) including a pulsed laser source (14) and a detector (16) which is sensitive to the radiation emanating from said laser source (14), and reflectors (10), the method comprising the steps of:

emitting pulses of light from said laser source (14);

forming a conical divergent beam by causing the pulses of laser radiation emanating from the laser source to diverge;

collecting the radiation reflected from the reflectors (10) in a wide field in order to transmit the same to the detector;

detecting said pulses of light which are reflected from a reflector and collected, by means of said detector (16);

measuring the transit times ($Dt_i$) of the pulses emitted by the laser source (14), reflected from a reflector (10) and detected by the detector (16); and determining relationships between said spatial coordinates in response to said transmit times measured in said step of measuring.

2. A method according to claim 1, wherein the conical divergent beam (8) has a semivertical angle ($\alpha$) within the range of 5° to 35°.

3. A method according to claim 1, further including the step of evaluating beforehand approximate spatial coordinates of the optical device (13) by means of an auxiliary positioning system.

4. A method according to claim 1, further including the steps of withdrawing a fraction of the laser pulse emitted by the laser source (14) before said laser pulse is caused to diverge, and directing said fraction to the detector (16) in order to deliver a transit time reference ($t_o$).

5. A method according to claim 1, further including the steps of amplifying the output signal of the detector (16) which is representative of the light intensity collected by the detector (16) and subjecting the amplified signal to digital sampling.

6. A method according to claim 5, wherein the digital sampling frequency of the amplified output signal of the detector (16) is higher than 1 gigahertz.

7. A method according to claim 5, further including the steps of:

withdrawing a fraction of the laser pulse emitted by the laser source (14) before said laser pulse is caused to diverge, directing said fraction to the detector (16) in order to deliver a transit time reference ($t_o$), processing the amplified and sampled output signal of the detector (16) in order to identify the peaks ($p_i$) of said output signal corresponding to reflection of the laser pulse form a reflector (10) and in order to determine the transit time ($Dt_i$) corresponding to the time intervals ($t_i - t_o$) between said transit time reference ($t_o$) and the instant ($t_i$) of appearance of said peaks ($p_i$), and recording a set of values representing said transit times ($Dt_i$) in memory (66).

8. A method according to claim 7, wherein the step which involves processing of the amplified and sampled signal and the step which involves recording in memory (66) are performed during the period which elapses between two successive emissions of pulses by the laser source (14).

9. A method according to claim 7, wherein the step which involves processing of the amplified and sampled signal includes a step of validating of the peaks ($P_i$) of the amplified and sampled output signal in order to eliminate peaks having a time-width exceeding a threshold value which is determined as a function of the duration of the pulse emitted by the laser source (14).

10. A method according to claim 1, wherein the optical device (13) is installed on board an aircraft (2).

11. A method according to claim 1, wherein each reflector (10) is rigidly fixed to a structure (46) which is anchored in the ground (4).

12. A method according to claim 1, further including the step of utilizing the measured transit times ($Dt_i$) of the laser pulses in order to determine with accuracy the spatial coordinates of the points (A) at which the reflectors (10) are placed.

13. A method according to claim 12 as applicable to high-precision topography, wherein the reflectors (10) are installed in the vicinity of a zone of extraction f geological resources, the predetermined spatial coordinates of the points (A) located at intervals in said zone being intended to supply information on subsidences within said zone.

14. A system for determining the spatial coordinates of points, comprising:
an optical device (13) including:
a pulsed laser source (14),
a detector (16) which is sensitive to the radiation emanating form said laser source (14),
divergent optical means (26, 28) for causing divergence of the radiation emitted by the laser source (14) in order to form a conical divergent beam (8), and
a wide-field light collector (30) placed in front of the detector (16) in order to transmit thereto radiation which is collected in a wide field;
reflectors (10) which reflect radiation from the pulsed laser source to the detector; and
means (34, 36, 68) for processing the output signal of the detector (16).

15. A system according to claim 14, wherein the divergent optical means (26, 28) comprise at least one planoconcave lens (26, 28).

16. A system according to claim 14, wherein the divergent optical means (26, 28) produce a conical divergent beam (8) having a semivertical angle ($\alpha$) within the range of 5° to 35°.

17. A system according to claim 14, wherein the laser source (14) delivers pulses having a time-duration of less than 50 ns.

18. A system according to claim 14, wherein the wide-field light collector (30) comprises a spherical lens (30).

19. A system according to claim 14, wherein the detector (16) comprises a pin photodiode (16).

20. A system according to claim 19, wherein the area of the sensitive surface (17) of the pin photodiode (16) is larger than 10 mm$^2$.

21. A system according to claim 18, wherein the sensitive surface (17) of the detector (16) is disposed in substantially tangent relation to the focal sphere (C) of the spherical lens (30).

22. A system according to claim 14, wherein the optical device (13) comprises in addition a dielectric mirror (22) which directs the radiation emanating from the laser source (14) to the divergent optical means (26, 28) and an optical-fiber segment (24) which extends between the rear face of the dielectric mirror (22) and the detector (16) in order to collect and direct to the detector (16) a fraction of the radiation emanating from the laser source (14), said fraction being withdrawn from the transmission loss of the dielectric mirror (22).

23. A system according to claim 14, wherein the optical device (13) is located on board an aircraft (2).

24. A system according to claim 23, wherein said system comprises in addition means for approximate evaluation of the spatial coordinates of the aircraft (2), such as a radio-transmission positioning system (6, 40, 42).

25. A system according to claim 14, wherein each reflector (10) is a reflector of the cube corner type, the vertex of which defines a point (A), the spatial coordinates of which are determined.

26. A system according to claim 14, wherein each reflector (10) is rigidly fixed to a structure (46) which is anchored in the ground (4).

27. A system according to claim 26, wherein the structure (46) which is anchored in the ground (4) comprises a substantially vertical pillar (52), the reflector (10) being placed on top of said pillar.

28. A system according to claim 26, wherein a window (54) having parallel faces is placed above each reflector (10), said window (54) being inclined with respect to a horizontal plane ($P_H$).

29. A system according to claim 14, wherein the means for processing the output signal of the detector (16) comprise an amplifier (34), a digital sampler (36) which samples the signal amplified by the amplifier (34) in order to convert it to histogram data which it stores in a buffer memory (37) and a microprocessor (68) which reads the histogram data stored in the buffer memory (37), performs a calculation of the transit times ($\Delta t_i$) of the reflected pulses and records in a memory (66) a set of values representing said transit times ($\Delta t_i$)

30. A system according to claim 29, wherein the amplifier (34) has a passband, the upper limit of which is below 50 MHz.

31. A system according to claim 19, wherein the pin photodiode (16) is supplied with reverse bias by an electric supply (62) and wherein a load resistor (64) is mounted in parallel with the circuit branch comprising the supply (62) and the pin photodiode (16).

32. A system according to claim 29, wherein the digital sampler (36) has a sampling frequency higher than 1 gigahertz.

33. An optical device (13) used for determining the spatial coordinates of points (A) according to the method of claim 1, comprising:
a laser source (14),
a detector (16) which is sensitive to the radiation emanating from said laser source (14),
divergent optical means (26, 28) for causing the radiation emitted by the laser source (14) to diverge in order to form a conical divergent beam (8), and
a wide-field light collector (30) placed in front of the detector (16) in order to transmit thereto a radiation which is collected in a wide field.

34. A method according to claim 3, wherein said auxiliary positioning system includes a radio transmission system (6, 40, 42).

* * * * *